June 26, 1945.    L. S. WILLIAMS    2,379,207
WEIGHING SCALE
Filed Feb. 24, 1944    3 Sheets-Sheet 1
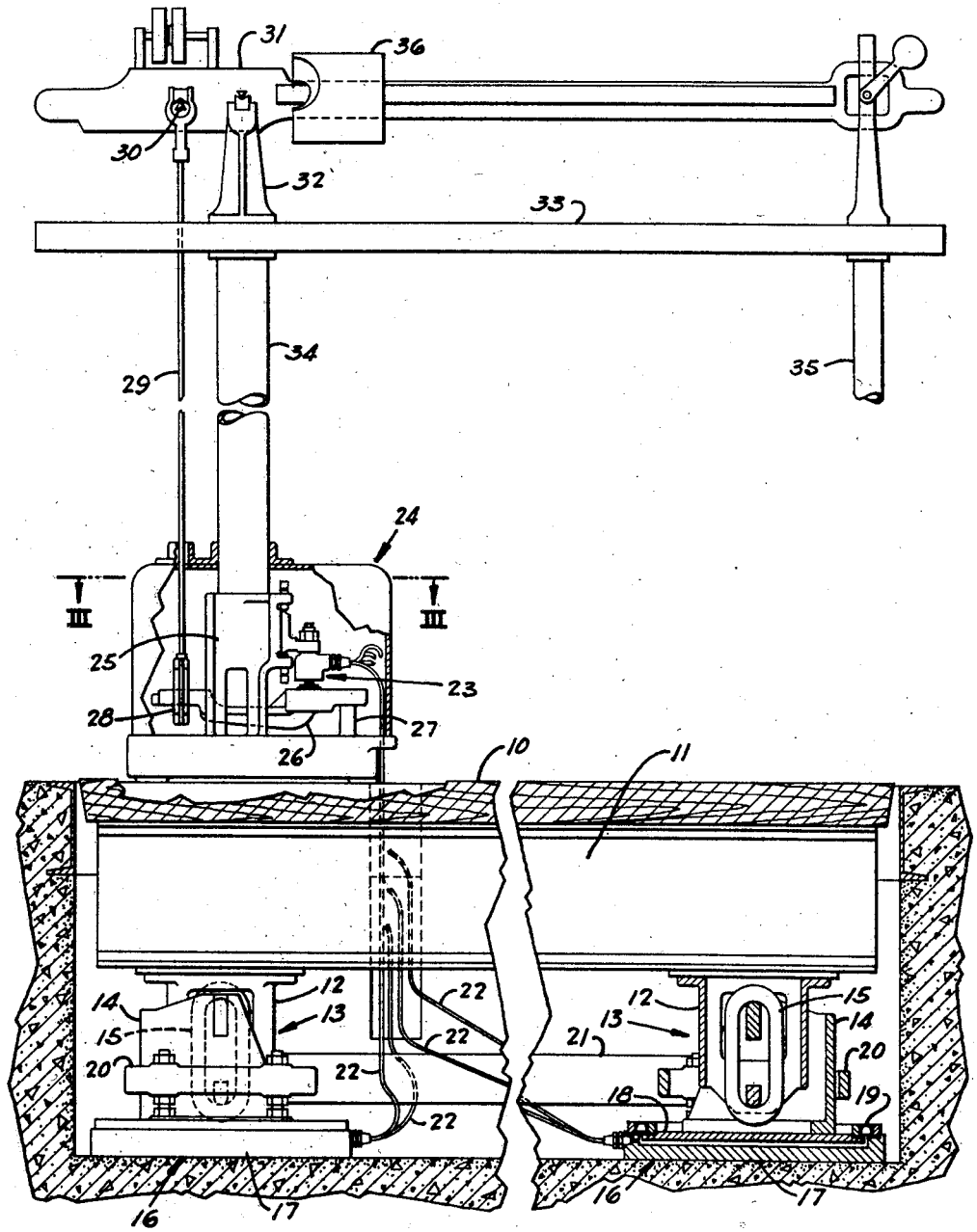
Fig. I
INVENTOR.
Lawrence S. Williams
BY
Marshall & Marshall
ATTORNEYS

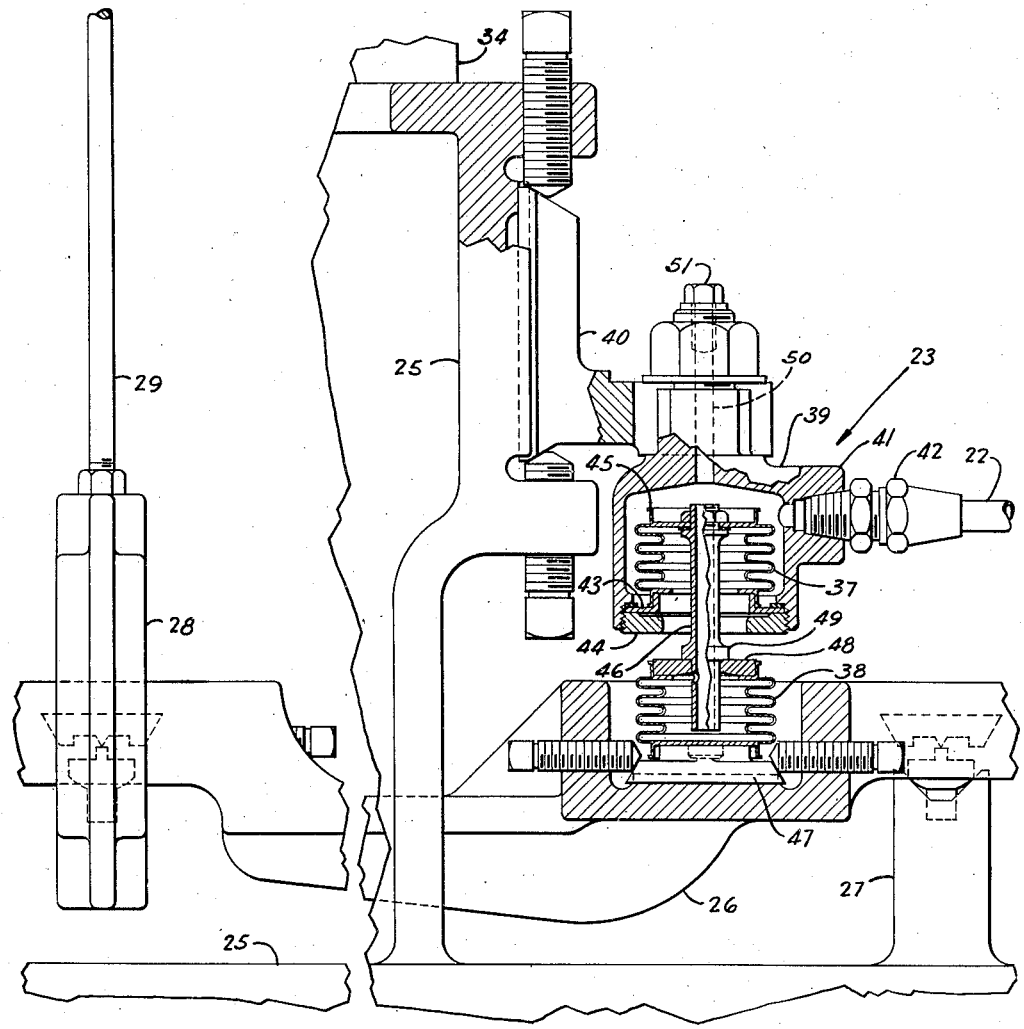
Fig. II
INVENTOR.
Lawrence S. Williams

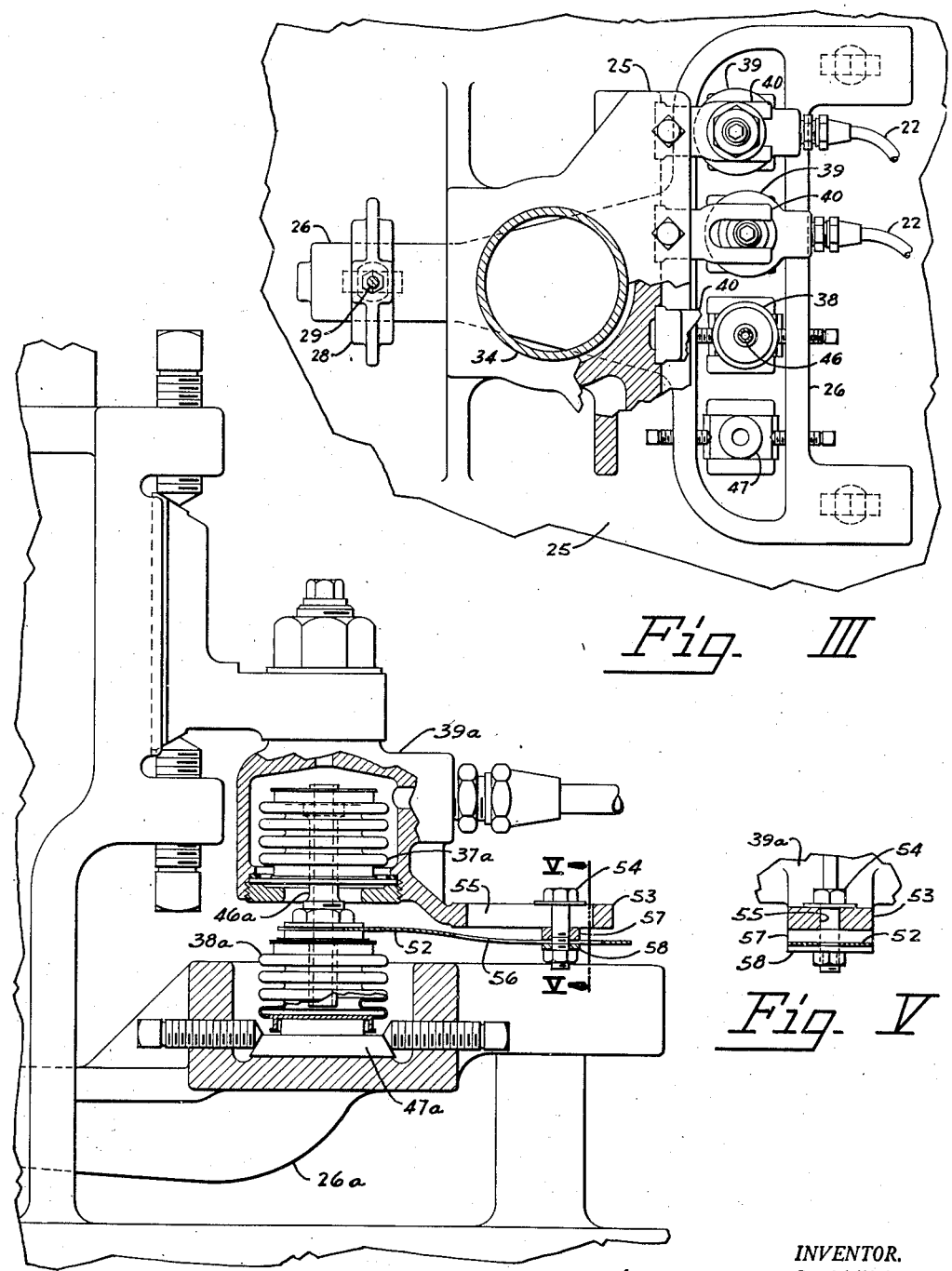

Patented June 26, 1945

2,379,207

UNITED STATES PATENT OFFICE 2,379,207

WEIGHING SCALE

Lawrence S. Williams, Toledo, Ohio, assignor to Toledo Scale Company, Toledo, Ohio, a corporation of New Jersey Application February 24, 1944, Serial No. 523,669

8 Claims. (Cl. 265—47)

There have been many attempts to build weighing scales incorporating a hydraulic force transmitting system between the load receiver and the counterbalancing mechanism. These hydraulic systems are advantageous in that they permit a shallower pit construction and eliminate the heavy lever system ordinarily used to support the load receiver.

The hydraulic force transmission systems comprise pressure transmitting capsules adapted to support the load receiver and to transform the mechanical forces applied to them into equivalent hydraulic pressures, and pressure receiving bellows adapted to transform the hydraulic pressures into mechanical forces which may be counterbalanced and indicated by a conventional weigh beam or similar weighing equipment. By making the effective area of the capsules large in comparison with the effective area of the bellows a relatively large force multiplication is obtained, i. e. a comparatively small force applied to the bellows can counterbalance a relatively heavy load.

In order that a hydraulic force transmitting system shall operate satisfactorily in a weighing scale it is necessary that the effective areas of the capsules and bellows remain constant independently of the force being transmitted. This is true because the effective areas determine the ratio of the hydraulic pressure to the force at each end of the system and as the hydraulic pressure is equal throughout the system the ratio of effective areas is equal to the force transmission ratio.

It has been found possible to construct a pressure transmitting capsule whose area remains constant within the required tolerance. However, commercially obtainable bellows do not maintain an exactly constant effective area and their change in area with load produces appreciable error in the scale indication.

The object of this invention is to provide a hydraulic force transmission system in which the error due to changes in bellows area is minimized or completely eliminated.

Another object is to provide an internally stressed bellows and an externally stressed bellows connected in series to transform hydraulic pressure into equivalent force on a lever.

More specific objects and advantages are apparent from the description, in which reference is had to the accompanying drawings illustrating a preferred form of hydraulic force transmitting system embodying the invention.

In the drawings:

Figure I is an elevation, partly in section, of a weighing scale incorporating hydraulic force transmitting elements.

Figure II is an elevation, partly in section, of a pressure receiving element.

Figure III is an enlarged plan of the hydraulic pressure receiving system and gathering lever taken substantially along the line III—III of Figure I.

Figure IV is an elevation, partly in section, of a pressure receiving unit incorporating a stabilizing spring.

Figure V is a vertical section taken along the line V—V of Figure IV and showing the method of mounting the stabilizing spring.

These specific drawings and the accompanying description are intended to merely illustrate and disclose the invention and not to impose limitations on the claims.

A load receiving platform 10 is supported on girders 11 which at their ends are carried on depending brackets 12. The brackets 12 are part of single link suspensions 13 which also include stands 14 and connecting links 15. The stands 14 are supported on hydraulic capsules 16, each of which has a base member 17 whose upper surface has a shallow fluid containing recess in which a load supporting diaphragm 18 is fitted and hydraulically supported. The fluid is retained by a flexible membrane 19 which seals the space between the base member 17 and the load supporting diaphragm 18. Stabilizing rings 20 secured to the stands 14 or to the load supporting diaphragms 18 are interconnected by an H shaped pipe framework 21 to prevent any tipping of the load supporting diaphragms 18 in the capsules 16. The space between the base members 17 and the diaphragms 18 of the capsules 16 which contains the hydraulic fluid communicates through tubes 22 with bellows structures 23 of a pressure receiving system 24. The force created by the hydraulic pressure in the bellows structures 23 acts between a base 25 and a gathering lever 26 which is pivotally supported on fulcrum stands 27 erected from a flat lower portion of the base 25. The force from the lever 26 is transmitted through a stirrup 28, a steelyard rod 29, to a load pivot 30 of a weigh beam 31. The weigh beam 31 is pivotally supported on a fulcrum stand 32 erected on a weigh beam shelf 33 which in turn is supported on columns 34 and 35. A poise 36 slidably mounted on the weigh beam 31 is adapted to counterbalance the loads applied to the load receiving platform 10.

Each bellows structure 23 comprises two bellows 37 and 38 arranged in series as shown in Figure II. The bellows 37 is enclosed in a substantially cup-shaped housing 39 which is adjustably mounted in a bracket 40 which in turn is adjustably mounted in the base 25. The cup-shaped housing 39 is provided with a boss 41 which is drilled and tapped to receive connections 42 on the end of the tube 22 leading to one of the load supporting capsules 16. The lower end of the bellows 37 is connected to an annular ring 43 which is sealed into the mouth of the cup-shaped housing 39 by a clamping ring 44. The upper end of the bellows 37 is provided with a cap 45 into which is fitted a hollow strut 46 which extends downward and out of the housing 39.

The other bellows 38 is mounted on a bellows base 47 which is mounted for a horizontal adjustment in the gathering lever 26. The upper end of the bellows 38 is closed by a sealing member 48 through which the lower end of the hollow strut 46 extends and against which a shoulder 49 of the strut 46 is pressed.

The hollow strut 46 extends nearly the full length of the bellows 38 and thus forms a stop to prevent the complete collapse of the bellows. To prevent entrapping air in the upper part of the bellows 38, when the system is being filled, the inside of the sealing member 48 is made concave and a hole is drilled through the side of the strut 46 at approximately the same level to allow the air in the bellows 38 to escape up through the strut 46. Likewise the upper part of the cup-shaped chamber in the housing 39 is provided with a vent tube 50 which is sealed by a cap screw 51. In this arrangement the interior of the bellows 38 and the interior of the cup-shaped housing 39 outside the bellows 37 are hydraulically connected and are in communication with the load supporting capsules 16 via the connection tube 22. The hydraulic pressure tends to compress the bellows 37 thus pushing the strut 46 downward and also to extend the bellows 38 thus pushing upwards on the strut 46 and downward on the lever 26. If the effective areas of the two bellows are exactly equal the forces of the bellows on the strut 46 are equal and it has no vertical motion.

Numerous experiments conducted to determine the source of errors in hydraulic force transmitting elements when used in weighing scales show that considerable error is present in the bellows units themselves. These experiments indicate that the effective area of an internally stressed bellows increases more rapidly during the application of the first part of the load than it does during the application of the latter part of the load. Thus, with an internally stressed bellows as the receiving element, if the scale is adjusted to be correct at zero and at full capacity, it will be found to be "fast" at half capacity, i. e. it will indicate that there is more load on the platform than is actually present.

When the hydraulic pressure is applied externally, as in the case of the bellows 37, the effect is reversed, i. e. the scale indication is "slow" at half capacity. These two effects are approximately equal although in individual cases considerable discrepancy may develop.

In the arrangement shown in Figure II the increase in effective area of the bellows 38 results in a small excess upward pressure on the strut 46 while the decrease in effective area of the bellows 37 appears as a deficiency in the downward force. A deficiency in downward force is equivalent to an excess in upward force and the two effects are thus additive. Under the influence of the unbalancing of the forces on the connecting strut 46, it and the ends of the bellows attached thereto moves upward until the unbalanced force is balanced by the spring action of the two bellows walls. The forces developed between the ends of each of the bellows by this motion is in such direction and amount as to compensate for the changes in effective areas, e. g., bellows 38, which tends to exert too much force, is stretched and the stretching tends to pull its ends together thus reducing the external force exerted. In this manner the force transmission to the lever 26 becomes more nearly exactly proportional to the hydraulic pressure applied to the pressure receiving structure 23.

The bellows 38 and strut 46 in effect form a column which because of the resilience of the bellows 38 is, under certain conditions, unstable. Figure IV, which is similar to Figure II, shows an externally stressed bellows 37a mounted in a cup-shaped housing 39a and connected through a hollow strut 46a to an internally stressed bellows 38a mounted on a bellows base 47a in a lever 26a. The tendency for the column formed by the bellows 38a and strut 46a to deflect laterally under load is resisted by a flat spring member 52 one end of which is attached to the strut 46a near its connection to the bellows 38a and whose other end is clamped to an arm 53 extending laterally from the housing 39a. While this is shown as a flat spring it may also take the form of a hinged or pivoted link.

In the manufacture of the bellows it is difficult to maintain an exactly constant area. It is therefore likely that in addition to the changes in effective area there is also present a difference in effective area due to manufacturing tolerance. This difference in area remains substantially constant throughout the changes of load and the deflection of the bellows produced thereby may become too great for satisfactory operation. To meet this condition the spring 52 may be given such a rate that it will control and minimize the deflection. It is desirable that the spring rate be kept as low as possible. Therefore a variable or adjustable rate spring is desirable. While many methods are available for changing the rate of a spring a variable clamping point is perhaps the simplest. As illustrated in Figures IV and V this clamp comprises a bolt 54 slidable in a slot 55 of the arm 53 and a parallel slot 56 in the spring 52. The spring 52 is spaced from the arm 53 by a spacer block 57 and is clamped between the block 57 and a clamping bar 58. Thus the rate of the spring 52 may be adjusted by merely loosening the bolt 54 and sliding it and the clamping members 57 and 58 along the arm 53 and then reclamping in the new location.

While the bellows 37 and 38 are shown of equal length, that is not a prerequisite to satisfactory operation. In fact, the bellows may be made in any desired ratio of lengths. For example, if it is found that the internally stressed bellows have in general a greater error than the externally stressed bellows, the internally stressed may be made shorter so that a given travel of the connecting strut acting through a shorter effective spring length produces a greater force between the ends of the internally stressed bellows than is produced between the ends of the longer externally stressed bellows. Thus it is possible to so construct the assembly that the forces produced by the strut motion substantially cancel the errors in each of the bellows.

By using this arrangement the accuracy of a hydraulic scale may be materially improved and the errors in the pressure receiving structure reduced to a minimum. With these improvements it is possible to build a hydraulic scale which may compete, on an accuracy standard, with the better grade lever scales.

Having described the invention, I claim:

1. In a hydraulic force transmitting system suitable for use in weighing scales, a pressure receiving unit comprising a series arrangement of a bellows adapted to receive hydraulic pressure internally and a bellows arranged to receive hydraulic pressure between itself and a surrounding cup, whereby the force created in each bellows is transmitted through the other.

2. In a hydraulic force transmitting system suitable for use in weighing scales, a pressure receiving unit comprising an externally stressed bellows, an internally stressed bellows and a hollow strut forming a mechanical and hydraulic connection between the bellows, when said bellows are arranged in series.

3. In a hydraulic force transmitting system suitable for use in weighing scales, in combination, a hydraulic capsule adapted to receive a force and convert it into equivalent hydraulic pressure, means to transmit hydraulic fluid pressure, and a pressure receiver employing an externally stressed and an internally stressed bellows connected in series to convert the hydraulic pressure into a force proportional to that received by the capsule.

4. In a hydraulic force transmitting system suitable for use in weighing scales, a pressure receiving structure comprising an externally stressed bellows, a hollow connecting strut and an internally stressed bellows arranged in series and hydraulically interconnected, and means for preventing lateral displacement of the strut under the influence of hydraulic pressure in the bellows.

5. In a hydraulic force transmitting system suitable for use in weighing scales, a pressure receiving structure comprising an externally stressed bellows, a hollow connecting strut and an internally stressed bellows arranged in series and hydraulically interconnected, and a flat spring for preventing lateral displacement of the strut under the influence of hydraulic pressure in the bellows.

6. In a weighing scale incorporating hydraulic force transmitting elements, a yieldable support for an internally stressed bellows connected to a weighing lever comprising an externally stressed bellows mounted in a cup-like retainer and connected to the internally stressed bellows by a hollow strut forming a hydraulic connection therebetween.

7. In a weighing scale incorporating hydraulic force transmitting elements, a yieldable support for an internally stressed bellows connected to a weighing lever comprising an externally stressed bellows mounted in a cup-like retainer and connected to the internally stressed bellows by a hollow strut forming a hydraulic connection therebetween and means for preventing lateral deflection of said strut with respect to the cup-like retainer.

8. In a weighing scale incorporating hydraulic force transmitting elements, a yieldable support for an internally stressed bellows connected to a weighing lever comprising an externally stressed bellows mounted in a cup-like retainer and connected to the internally stressed bellows by a hollow strut forming a hydraulic connection therebetween and a flat spring for preventing lateral deflection of said strut with respect to the cup-like retainer.

LAWRENCE S. WILLIAMS.